United States Patent
Boehm

(10) Patent No.: US 11,642,193 B2
(45) Date of Patent: May 9, 2023

(54) CARTRIDGE, A PISTON AND A SYRINGE COMPRISING THE CARTRIDGE AND THE PISTON

(71) Applicant: 3M INNOVATIVE PROPERTIES COMPANY, St. Paul, MN (US)

(72) Inventor: Andreas J. Boehm, Reichling (DE)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 326 days.

(21) Appl. No.: 16/889,341

(22) Filed: Jun. 1, 2020

(65) Prior Publication Data

US 2020/0289237 A1    Sep. 17, 2020

Related U.S. Application Data

(63) Continuation of application No. 15/034,395, filed as application No. PCT/US2014/063698 on Nov. 3, 2014, now abandoned.

(30) Foreign Application Priority Data

Nov. 12, 2013   (EP) ..................................... 13192570

(51) Int. Cl.
   *A61C 5/68*   (2017.01)
   *A61C 5/64*   (2017.01)

(52) U.S. Cl.
   CPC . *A61C 5/68* (2017.02); *A61C 5/64* (2017.02)

(58) Field of Classification Search
   CPC ........... A61C 5/062; A61C 5/064; A61C 5/60; A61C 5/62; A61C 5/68; A61C 5/64; A61M 5/19; A61M 5/24; A61M 5/31596
   USPC ....... 222/135, 136, 137, 145.1, 145.5, 145.6
   See application file for complete search history.

(56) References Cited

U.S. PATENT DOCUMENTS

| | | | |
|---|---|---|---|
| 3,347,420 A | 10/1967 | Donoghue | |
| 4,240,566 A | 12/1980 | Bergman | |
| 4,801,046 A * | 1/1989 | Miczka | .................. B65D 83/64 |
| | | | 222/485 |
| 4,869,400 A | 9/1989 | Jacobs | |
| 4,978,336 A | 12/1990 | Capozzi | |
| 4,981,241 A | 1/1991 | Keller | |
| 4,989,758 A | 2/1991 | Keller | |

(Continued)

FOREIGN PATENT DOCUMENTS

| | | |
|---|---|---|
| EP | 3068333 B1 | 5/2019 |
| JP | 08-505110 | 6/1996 |

(Continued)

OTHER PUBLICATIONS

International Search Report for PCT International Application No. PCT/US2014/063698 dated Jan. 27, 2015, 4 pages.

(Continued)

*Primary Examiner* — Cris L. Rodriguez
*Assistant Examiner* — Drew S Folgmann

(57) ABSTRACT

A cartridge and a piston for storing and dispensing a two-component dental material. The cartridge and the piston have a cross-section which substantially correspond to a D-shape in which the perimeter of the D-shape is defined by a plurality of circle segments only. At least two of the circle segments are based on different radii. The invention helps maximizing the time period over which a dental material can be stored in the compartment.

10 Claims, 2 Drawing Sheets

(56) References Cited

U.S. PATENT DOCUMENTS

| | | | |
|---|---|---|---|
| 5,333,760 | A | 8/1994 | Simmen |
| 5,386,928 | A | 2/1995 | Blette |
| D362,722 | S | 9/1995 | Simmen |
| 5,609,271 | A | 3/1997 | Keller |
| 5,702,033 | A * | 12/1997 | Beaver .................. B65D 35/22 222/94 |
| 5,823,391 | A | 10/1998 | Klauke |
| 6,394,314 | B1 | 5/2002 | Sawhney |
| 7,981,531 | B2 | 7/2011 | Rheinberger |
| 8,691,122 | B2 | 4/2014 | Rheinberger |
| 8,721,336 | B2 | 5/2014 | Rheinberger |
| 2007/0166660 | A1 | 7/2007 | Peuker |
| 2008/0054020 | A1 | 3/2008 | Pierson |
| 2008/0064011 | A1 | 3/2008 | Rheinberger |
| 2011/0056985 | A1 | 3/2011 | Bublewitz |
| 2011/0084094 | A1 | 4/2011 | Reidt |
| 2016/0270879 | A1 | 9/2016 | Boehm |

FOREIGN PATENT DOCUMENTS

| | | |
|---|---|---|
| RU | 2245168 | 1/2005 |
| WO | WO 2005-016170 | 2/2005 |

OTHER PUBLICATIONS

Lekner, John, "Viscous Flow Through Pipers of Various Cross-Sections", Eur. J. Phys. 28 (2007) pp. 521-527, Apr. 12, 2007.

* cited by examiner

A-A

CARTRIDGE, A PISTON AND A SYRINGE COMPRISING THE CARTRIDGE AND THE PISTON

FIELD OF THE INVENTION

The invention relates to a cartridge, a piston and a syringe comprising such a cartridge and piston. In particular the invention relates to a new substantial D-shape for the cross-sections of cartridge compartments and corresponding pistons cooperating with such compartments. Such substantial D-shape is particularly defined by a plurality of circle segments only.

BACKGROUND ART

Dental materials are often stored in packages from which they can be directly dispensed to a desired location. For example the dental materials may be dispensed from the package on a pad or into a well and from there applied within a patient's mouth. In other situations the dental materials may be placed into a patient's mouth directly from such a package.

Dental materials further are often prepared from two or more components that are mixed together just before use. Often the individual components are obtained as portions from larger packages, for example from tubes, bags or cartridges. There are packages on the market that allow manual or automatic dispensing of two or more components at desired amounts and at an appropriate ratio for mixing. Furthermore there are packages that allow dispensation of portions of readily mixed materials from individually stored components.

Often double-barrel syringes are used for storing and mixing two-component dental materials. Such double-barrel syringes typically have two side by side tubular barrels from which the components of the dental material can be extruded by pushing pistons into the respective barrel. In one configuration of such a double-barrel syringe has D-shaped barrels which, arranged side by side, overall form one cylindrical structure as disclosed for example in U.S. Design Pat. No. 362,722.

Although existing syringes provide certain advantages there is still a need to provide a syringe which is relatively compact and easy to use, but which further provides a relatively long shelf-life for the components stored therein.

SUMMARY OF THE INVENTION

The invention concerns in one aspect a cartridge for storing and dispensing a two-component dental material. The cartridge comprises two compartments each extending within the cartridge at a cross-section which substantially corresponds to a D-shape. The perimeter of the D-shape is defined by a plurality of circle segments only. Further at least two of the circle segments are based on or have different radii. Each of the different radii are definite.

For the purpose of the present invention a "circle segment" is understood as a technical term having a definite radius. The circle segment particularly differs technically from a straight line which only mathematically may be defined as a circle having an indefinite radius.

The invention is advantageous in that it helps maximizing the tightness of a seal between the pistons and the cartridge. Further the invention helps maximizing the time period over which the dental material, or components thereof can be stored within the cartridge closed by the pistons without the dental material substantially alters in its properties.

The cartridge of the invention may extend generally linear along a longitudinal axis. The cartridge preferably has an outer cylindrical shape over a major part of a cartridge length over which the cartridge extends. The compartments may extend parallel relative to each other and parallel to the longitudinal axis. Preferably each of the compartments extends at a generally uniform cross-section. The two compartments are preferably separated from each other by a separation wall of the cartridge.

In one embodiment the compartments are sized for storing the two components at a volume ratio of 1:1. However in other embodiments the compartments may be sized for storing the two components at volume ratios of 1:2, 1:3, 1:5, 1:10, or any other appropriate ratio. Such different volume ratios preferably provide respective different mixing ratios of the components by use of the compartment and may be implemented by unequally sized D-shapes of the compartment cross-sections.

In one embodiment the circle segments join each other at their ends such that all circle segments together form a closed line defining the perimeter of the compartment cross-section.

In a further embodiment the circle segments join or are concatenated such that respective tangents of the two circle segments through the joint coincide. Thus the perimeter of the cross-section extends free of any sharp edges.

In a further embodiment the perimeter of the compartment cross-section is defined by only four circle segments, which merge into one another and form a closed line. In particular the perimeter of the compartment cross-section is preferably defined by only a first, second, third and fourth circle segment. The first and second circle segment may be based on different radii and join at one of their ends with the third circle segment and join on the other of their ends with the fourth circle segment. The third and the fourth circle segment are preferably based on or have the same radius. The radius of the third and fourth circle segment is preferably smaller than the radius of each of the first and second circle segment, for example, the radius of the third and fourth circle segment may be between ⅓ and ¹⁄₁₀ of the radius of the second circle segment. Further the radius of the second circle segment is preferably smaller than the radius of the first circle segment, for example the radius of the second circle segment may be between ⅓ and ⅛ of the radius of the first circle segment. In a preferred embodiment the radii may be as follows:

- the radius of the first circle segment may be between about 10 mm and about 50 mm, preferably about 20 mm;
- the radius of the second circle segment may be between about 2 mm and about 16 mm, preferably about 4 mm; and
- the radius of the third and fourth circle segment may be between about 0.3 mm and about 3 mm, preferably about 0.7 mm.

Preferably the curvature of the first, second, third and fourth circle segment continues in the same direction, although the magnitude of the curvature may vary in accordance to the different radii of the first, second, third and fourth circle segment. In other words the closed line formed of the first, second, third and fourth circle segment preferably does not comprise any inflection point.

In a further embodiment the cartridge comprises at a front portion an outlet for each of the compartments for extruding one of the two components from the cartridge. The cartridge further has a rear portion opposite of the front portion, wherein the rear portion may be configured to receive a piston within the compartment. In particular the rear portion may be configured such that a piston can be received within each of the compartments.

In a further aspect the invention relates to piston for dispensing a component of a dental material. The piston preferably is adapted to cooperate with the cartridge of the invention. In particular the piston is preferably sized and shaped to slidably fit into one or any of the compartments of the cartridge. The piston accordingly has a cross-section which substantially corresponds to a D-shape. The piston cross-section as referred to herein refers to a cross-section on a plane transverse to a dimension in which the piston is movable for dispensing the dental material. Further the perimeter of the D-shape of the piston's cross-section is defined by a plurality of circle segments only. Again at least two of the circle segments are based on or have different radii.

In an embodiment the circle segments join each other at their ends such that all circle segments together form a closed line defining the perimeter of the compartment cross-section. The circle segments preferably join or are concatenated such that respective tangents of the two circle segments through the joint coincide.

In a further embodiment the perimeter of the piston cross-section is defined by only four circle segments, which merge into one another and form a closed line. The perimeter of the piston cross-section is preferably defined by only a first, second, third and fourth circle segment, the first and second circle segment being based on different radii and join at one of their ends with the third circle segment and join on the other of their ends with the fourth circle segment. The third and the fourth circle segment are preferably based on or have the same radius. The radius of the third and fourth circle segment is preferably smaller than the radius of each of the first and second circle segment, for example the radius of the third and fourth circle segment may be between 1/3 and 1/10 of the radius of the second circle segment. Further the radius of the second circle segment is preferably smaller than the radius of the first circle segment, for example the radius of the second circle segment may be between 1/3 and 1/8 of the radius of the first circle segment. The radii of the first, second, third and fourth circle segment of the periphery of the piston cross-section preferably correspond to an offset plus the respective radius of the first, second, third and fourth circle segment of the periphery of the compartment cross-section. The offset may be between about 0.1 mm to about 0.5 mm. Hence preferred radii may be as follows:

- the radius of the first circle segment may between about 10.1 mm and about 50.5 mm, preferably about 20.1 mm;
- the radius of the second circle segment may between about 2.1 mm and about 16.5 mm, preferably about 4.1 mm; and
- the radius of the third and fourth circle segment may between about 0.4 mm and about 3.5 mm, preferably about 0.8 mm.

In a further embodiment the piston comprises a, preferably skirt-type, flexible sealing lip. The sealing lip preferably forms the outermost perimeter of the piston's cross-section. Any dimensions of the piston cross-section as defined herein accordingly refer to outermost perimeter of the piston's cross-section. The piston may have a piston body having a piston front side and a piston rear side. The piston front side refers to the side which is intended to face the component in the chamber, whereas the piston rear side is intended to face away from the component. The sealing lip is preferably protruding from the piston body at the front side of the piston. It is preferred that the cross-section of the sealing lip increases in a direction along which the sealing lip protrudes from the piston body. In particular in a direction along which the sealing lip protrudes from the piston body each of the radii of the circle segments increases, preferably be the same offset.

In a further embodiment the cartridge contains the dental material in the form of two components. Preferred dental materials may be selected from among: dental liners, dental flowables, dental composites, dental resin cements, dental resin modified glass ionomer cements, dental impression materials and dental filling materials.

In a preferred embodiment the cartridge and/or the piston is/are made of a plastic material, in particular (high density) polypropylene, polybutadiene terephthalate, polyamide, or polyoxymethylene.

In a further aspect the invention concerns a syringe which comprises a cartridge according to the invention and two pistons of the invention. The syringe may further comprise a dispensing nozzle and a static mixer arranged in the dispensing nozzle. Such a syringe may be configured to mix the two components as they are dispensed through the dispensing nozzle. The nozzle may be made of polypropylene or polycarbonate.

In still a further embodiment the syringe comprising a plunger for pushing the pistons into the respective compartments for extruding the components towards the dispensing nozzle. The plunger and the piston may be formed in one piece (for example monolithically formed) or may be assembled from the two pistons and the plunger as separate parts.

The plunger may be made of (high density) polypropylene, polybutadiene terephthalate, polyamide, or polyoxymethylene. All parts of the syringe may be made by injection molding. Thus a relatively inexpensive syringe may be provided.

DETAILED DESCRIPTION OF THE INVENTION

Figure 1:
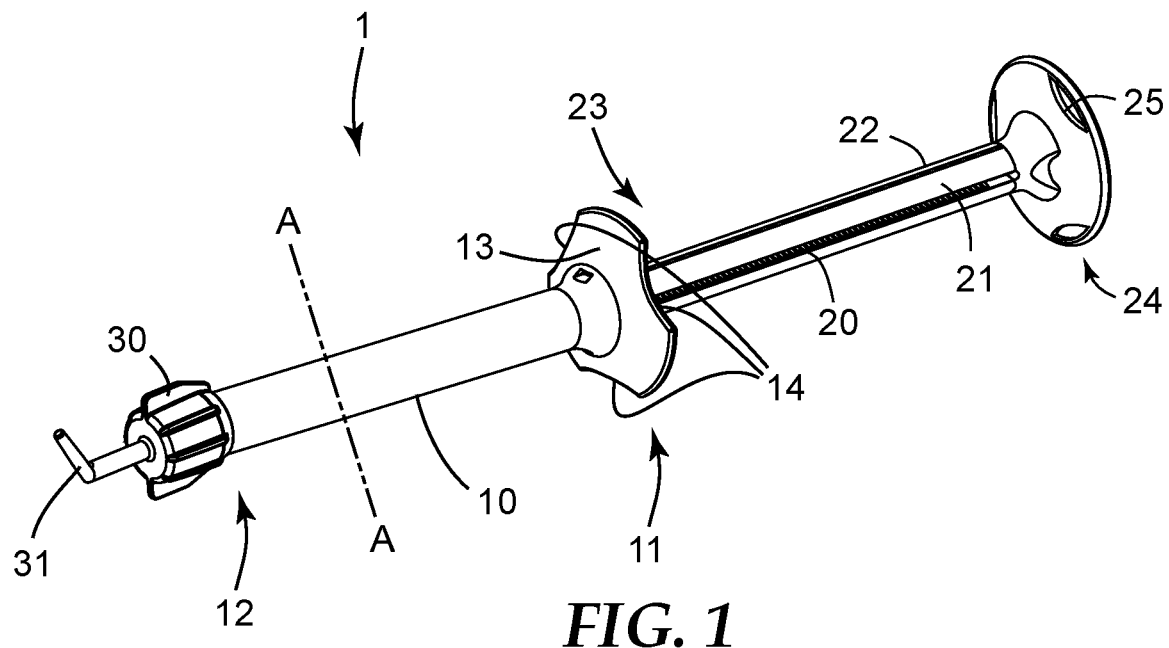
FIG. 1 is a perspective view of a syringe according to an embodiment of the invention.

FIG. 1 shows a syringe 1 having a cartridge 10 of the invention, a plunger 20 and a dispensing nozzle 30. The cartridge 10 of the syringe 1 is pre-filled with two components of a dental material. The cartridge 10 is closed at a rear portion 11 of the cartridge 10 by the plunger 20. Further the cartridge 10 has outlets (not visible in this view) which are openably closed at a front portion 12 by the dispensing nozzle 30. In the example the front portion 12 of the cartridge 10 and the dispensing nozzle 30 in combination form a rotary slide valve. Such rotary slide valve is adapted for a rotation between a closed position, in which the outlets of the cartridge 10 are closed by the dispensing nozzle 30, and an open position, in which the outlets are in fluid communication with an exit conduit 31 formed by the dispensing nozzle 30. Thus in the open position the components contained in the syringe 1 are enabled to be extruded from the cartridge 10 through the exit conduit 31 of the dispensing nozzle 30.

In the example the cartridge 10 extends at a generally cylindrical outer shape. It has been found that such a shape provides for relatively convenient manual positioning of the syringe during operation by a user. In particular the cartridge is preferably rotatable by handling of the cartridge 10 at the cylindrical outer shape. Accordingly the cartridge 10 (and thus also of the syringe 1) may be rotatably positioned relatively easy and single-handed.

Further the cartridge in the example has a non-circular finger plate 13. Although the shape of the finger plate 13 is based on a circular shape, cutaways 14 provide for flats or supporting points which hinder the cartridge 10 in rolling over a flat surface. Thus if the syringe 1 is disposed on a dentists tablet or table, the finger plate 13 of the cartridge 10 preferably prevents the syringe from rolling and falling off.

The plunger 20 has two plunger rods 21, 22 which are received at a front end 23 of the plunger 20 within compartments (not shown) in the cartridge 10. At a rear end 24 the plunger 20 has a finger plate 25. The finger plate 25 allows the plunger 20 to be pushed forward by a user for extruding the dental material from the syringe 1.

Figure 2:
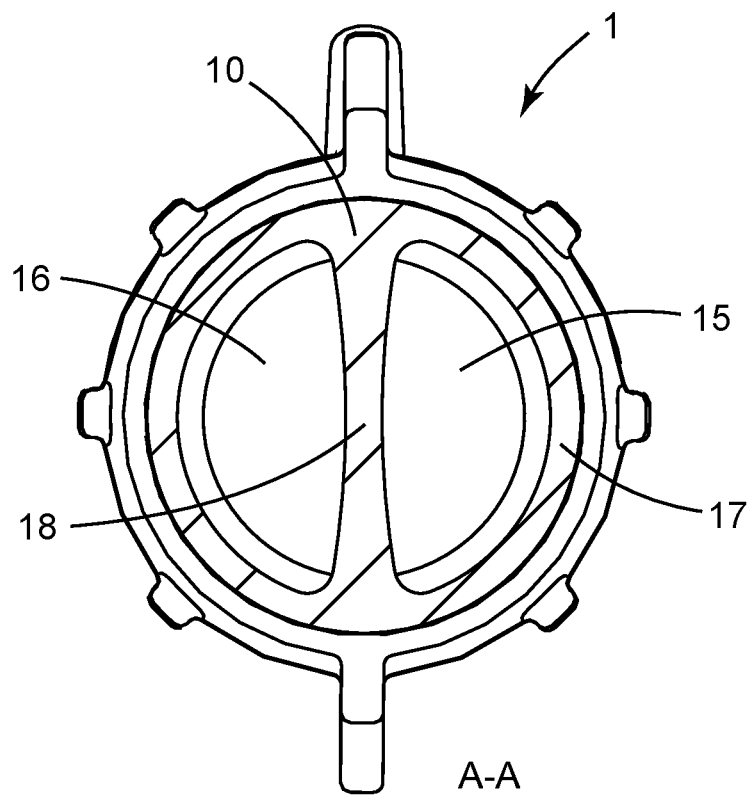
FIG. 2 is a cross-sectional view through the syringe shown in FIG. 1

FIG. 2 shows a cross-sectional view of the syringe 1 through the cartridge 10. The cartridge 10 has two compartments 15, 16 which extend through the cartridge 10 at a substantially D-shaped cross-section. As shown the two substantial D-shapes are arranged in a mirrored fashion relative to each other so that the cartridge 10 has, on the one hand, a generally cylindrical outer shape, and on the other end forms an outer wall 17 with a separation wall 18 having a substantially uniform wall thickness. The substantially uniform wall thickness facilitates for example manufacturing of the cartridge by injection molding.

Figure 3:
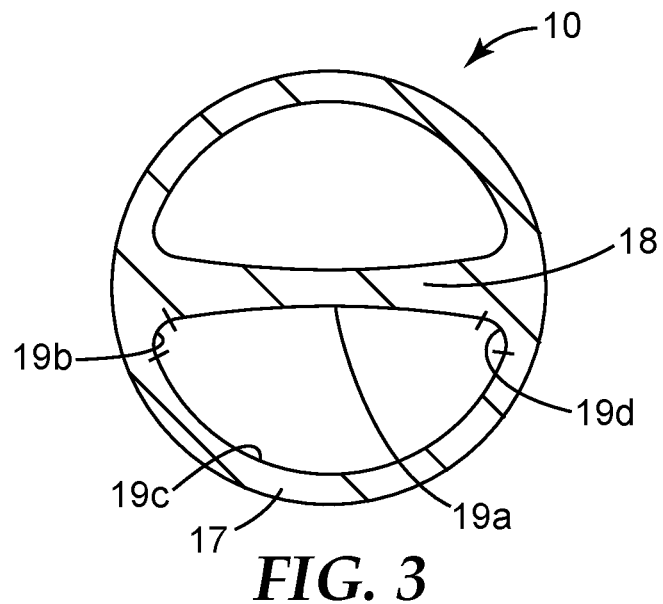
FIG. 3 is a cross-sectional view of the cartridge according to an embodiment of the invention.

FIG. 3 illustrates the cross-sectional shape of the cartridge 10 in more detail. In particular the perimeter of the D-shape is defined by a plurality of circle segments 19a, 19b, 19c and 19d only. (Circle segments 19a, 19b, 19c and 19d correspond to the first, third, second and forth circle segment, respectively.) The circle segment 19a adjacent the separation wall is based on a different radius than the opposite circle segment 19c adjacent the outer wall 17. In particular the circle segment 19a is based on a larger radius than the circle segment 19c. Thus, on the one hand, a substantial D-shape is achieved but, on the other hand, a straight segment can be avoided. It has been found that a compartment having a cross-section based on only circular structures allows more reliable sealing compared to a cross-section having one or more straight structures. Further the circle segments 19a, 19b, 19c and 19d join in a manner such that at the joint of two circle segments respective tangents through that joint on each circle segment coincide. Or in other words the circle segments 19a, 19b, 19c and 19d smoothly merge into one another and together form a closed line defining the perimeter of the cross-section.

Figure 4:
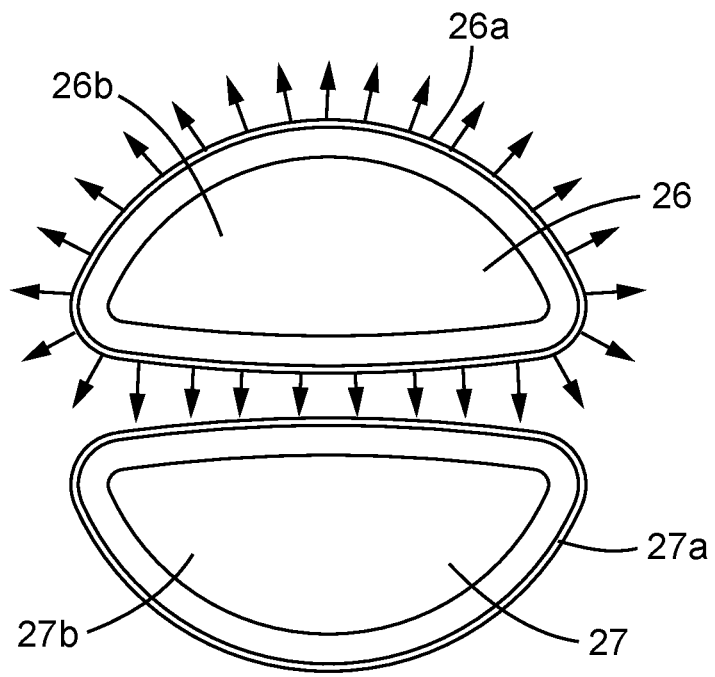
FIG. 4 is a front view on two pistons according to an embodiment of the invention.

FIG. 4 shows a bottom view on two pistons 26, 27. Each of the two pistons 26, 27 are configured for press-fitting into a respective compartment of the cartridge shown in FIGS. 1 to 3. In particular the cross-sectional shape of each piston corresponds to the cross-sectional shape of the respective compartment. However the pistons 26, 27 are preferably oversized, in particular two-dimensionally enlarged by an offset, relative to the cross-sectional shape of the respective compartment.

Each piston 26/27 has a skirt-type lip seal 26a/27a respectively. In the example each lip seal 26a/27a protrudes from a front face 26b/27b of the piston 26/27 and forms a circumferential sealing edge at its front most end. The shape of the sealing edge corresponds to a two-dimensionally enlarged shape of the cross-sectional shape of the respective compartment. Thus the lip seal 26/27 is adapted to form a press fit with the cartridge wall forming the compartment in which the piston 26/27 is received. Accordingly the lip seal 26/27 is adapted to form a tight seal with the cartridge wall forming the compartment. In the example the lip seal 26/27 protrudes substantially funnel-shaped—although at a substantial D-shaped cross-section—with the funnel opening toward the free end of the lip seal 26/27. For use the piston 26/27 is preferably assembled within the respective compartment of the cartridge with the lip seal 26/27 oriented toward the respective component stored in the compartment. Accordingly pushing the piston 26/27 toward the component for dispensing the component causes the component to be pressurized and due to the pressure built up in the component the lip seal is preferably urged toward the cartridge wall that forms the compartment. Thus increasing pressure exerted to the component during pushing the piston 26/27 preferably causes the seal effect to increase. Therefore leakage during dispensation may be minimized. Further it has been found that due to the cross-sectional shape of the lip seal based on only circular segments a sealing effect (see arrows in the Figure) is provided along the entire circumference of the lip seal 26/27 independent from any pressure built up in the component. This is in contrast to a D-shaped lip seal having a cross-sectional shape which comprises a straight section. The straight section of the lip seal may toward its middle portion—depending on the pressure built up in the component—provide only a small sealing effect or may even fail to provide any sealing effect so that leakage may occur. Such insufficient sealing effect may particularly occur during storage of a cartridge during which the pressure, if any, within the compartments is low or even an underpressure is created due to temperature variations. Therefore the invention helps maximizing the sealing effect between a piston and a cartridge that are based on a substantially D-shaped configuration.

The invention claimed is:

1. A dispensing assembly including a cartridge for storing an dispensing a two-component dental material, the assembly comprising: two compartments each extending within the cartridge, each compartment having a compartment cross-section that defines a generally D-shape perimeter, wherein the D-shape perimeter is defined by a plurality of circle segments only, each circle segment of the plurality of circle segments having a definite radius so the D-shape perimeter, and wherein at least two of the circle segments are based on different definite radii and positioned at directly opposite sides of the D-shape perimeter from each other; and a separation wall, wherein the two compartments are separated from each other by the separation wall; outer shell having a cylindrical outer shape, wherein the two compartments with the D-shaped perimeter are arranged in a mirrored fashion relative to each other within the outer shell with the separation wall between the two compartments; wherein the circle segments join each other at their ends such that all circle segments together form a closed line defining the D-shape perimeter of the compartment cross-section; and a piston for dispensing the dental material, the piston having a piston cross-section that defines a generally D-shape perimeter, wherein the D-shape perimeter is defined by a plurality of circle segments only, each circle segment of the plurality of circle segments having a definite radius so the D-shape perimeter does not include any straight lines, and wherein at least two of the circle segments are based on different radii and positioned at directly opposite sides of the D-shape perimeter from each other.

2. The assembly of claim 1, wherein the first circle segment is adjacent the separation wall and is based on a different radius than the third circle segment that is adjacent an outer wall of the compartment.

3. The assembly of claim 2, wherein the third and the fourth circle segments are based on the same radius, which is smaller than the radius of each of the first and second circle segments.

4. The assembly of claim 1, further comprising at a front portion an outlet for each of the compartments for extruding one of the two components from the cartridge and a rear portion opposite of the front portion, wherein the rear portion is configured to receive the piston within each compartment.

5. The assembly of claim 1, wherein the D-shape perimeter of the two compartments cross-section is defined by only a first, second, third, and fourth circle segment, and wherein the first and second circle segments are based on different radii, each of the first and second circle segments having a first and a second end, and the first ends of the first and second circle segments join with the third circle segment and the second ends of the first and second circle segments join with the fourth circle segment to form the D-shape perimeter.

6. The assembly of claim 1, wherein the circle segments of the piston join each other at their ends such that all circle segments together form a closed line defining the D-shape perimeter of the piston cross-section.

7. The assembly of claim 1, wherein the circle segments of the piston are concatenated.

8. The assembly of claim 7, wherein the D-shape perimeter of the piston cross-section is defined by only a first, second, third, and fourth circle segment, the first and second circle segments are based on different radii, each of the first and second circle segments having a first and a second end, and the first ends of the first and second circle segments join with the third circle segment and the second ends of the first and second circle segments join with the fourth circle segment to form the D-shape perimeter.

9. The assembly of claim 8, wherein the third and the fourth circle segments of the piston are based on the same radius, which is smaller than the radius of each of the first and second circle segments.

10. The assembly of claim 1, further comprising a flexible sealing lip.

* * * * *

UNITED STATES PATENT AND TRADEMARK OFFICE
CERTIFICATE OF CORRECTION

PATENT NO. : 11,642,193 B2
APPLICATION NO. : 16/889341
DATED : May 9, 2023
INVENTOR(S) : Andreas Boehm It is certified that error appears in the above-identified patent and that said Letters Patent is hereby corrected as shown below:

In the Claims

Column 6
Line 45, In Claim 1, delete "storing an dispensing" and insert -- storing and dispensing --, therefor.

Signed and Sealed this
Seventeenth Day of October, 2023

*Katherine Kelly Vidal*

Katherine Kelly Vidal
*Director of the United States Patent and Trademark Office*